US008458480B2

(12) United States Patent
Iliev et al.

(10) Patent No.: US 8,458,480 B2
(45) Date of Patent: *Jun. 4, 2013

(54) METHOD AND APPARATUS FOR BINDING TPM KEYS TO EXECUTION ENTITIES

(75) Inventors: Alexander Iliev, Hanover, NH (US); Vincent R. Scarlata, Beaverton, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/016,145

(22) Filed: Jan. 28, 2011

(65) Prior Publication Data

US 2011/0191574 A1 Aug. 4, 2011

Related U.S. Application Data

(63) Continuation of application No. 11/170,853, filed on Jun. 30, 2005, now Pat. No. 7,908,483.

(51) Int. Cl.
*H04L 29/06* (2006.01)
*H04L 9/32* (2006.01)
*H04L 9/00* (2006.01)
*G06F 21/00* (2006.01)

(52) U.S. Cl.
USPC ........... 713/176; 713/156; 713/164; 713/186; 380/44; 380/277

(58) Field of Classification Search
None
See application file for complete search history.

(56) References Cited

U.S. PATENT DOCUMENTS

| 7,461,249 | B1 | 12/2008 | Pearson et al. |
| 7,552,419 | B2 * | 6/2009 | Zimmer et al. ............... 717/121 |
| 7,565,553 | B2 * | 7/2009 | Hunter et al. ................. 713/192 |
| 7,634,807 | B2 * | 12/2009 | Yan et al. ......................... 726/22 |
| 2003/0138105 | A1 | 7/2003 | Challener et al. |
| 2005/0005112 | A1 | 1/2005 | Someren |
| 2005/0060568 | A1 | 3/2005 | Beresnevichiene et al. |
| 2005/0138393 | A1 | 6/2005 | Challener et al. |
| 2005/0283601 | A1 | 12/2005 | Tahan |
| 2006/0129824 | A1 | 6/2006 | Hoff et al. |
| 2006/0143446 | A1 * | 6/2006 | Frank et al. ................... 713/164 |
| 2006/0155988 | A1 | 7/2006 | Hunter et al. |
| 2006/0182276 | A1 | 8/2006 | Sandhu et al. |
| 2006/0259782 | A1 | 11/2006 | Wang et al. |

OTHER PUBLICATIONS

Non-Final Office Action mailed Sep. 22, 2009 for U.S. Appl. No. 11/170,853.

(Continued)

*Primary Examiner* — Shin-Hon Chen
(74) *Attorney, Agent, or Firm* — Blakely, Sokoloff, Taylor & Zafman LLP

(57) ABSTRACT

A method and apparatus for binding trusted platform module (TPM) keys to execution entities are described. In one embodiment, the method includes the receipt of an authorization request issued by an execution entity for authorization data. According to the authorization request, the execution entity may be measured to generate an entity digest value. Once the entity digest value is generated, a platform reference module may grant the authorization request if the entity digest value verifies that the execution entity is an owner of the key held by the TPM. Accordingly, in one embodiment, a platform reference module, rather than an execution entity, holds the authorization data required by a TPM to use a key owned by the execution entity and held within sealed storage by the TPM. Other embodiments are described and claimed.

31 Claims, 7 Drawing Sheets

OTHER PUBLICATIONS

Non-Final Office Action mailed Dec. 9, 2008 for U.S. Appl. No. 11/170,853.
Final Office Action mailed Jun. 3, 2009 for U.S. Appl. No. 11/170,853.
Final Office Action mailed Mar. 9, 2010 for U.S. Appl. No. 11/170,853.
Notice of Allowance mailed Jan. 21, 2011 for U.S. Appl. No. 11/170,853.

* cited by examiner

METHOD AND APPARATUS FOR BINDING TPM KEYS TO EXECUTION ENTITIES

The present application is a Continuation of, and claims priority to and incorporates by reference in its entirety, the corresponding U.S. patent application Ser. No. 11/170,853, filed Jun. 30, 2005, and entitled "METHOD AND APPARATUS FOR BINDING TPM KEYS TO EXECUTION ENTITIES," and issued as U.S. Pat. No. 7,908,483 on Mar. 15, 2011.

FIELD

One or more embodiments relate generally to the field of data security. More particularly, one or more of the embodiments relate to a method and apparatus for binding trusted platform module (TPM) keys to execution entities.

BACKGROUND

In a world increasingly influenced by the existence of networks connecting a widespread array of computing resources, the topics of data security, information protection, and user privacy have never been more important. Personal computers (PCs) typically offer an open architecture as an industry standard which can be used to build a ubiquitous computing platform. Trust in the platform, however, has not commonly been part of such designs. As used herein, the term "platform" can be taken to mean any type of device, including hardware, firmware, software, or any combination of these, whose activity is directed according to a plurality of programmed instructions.

Typically, platforms execute under the control of an Operating System (OS) when applications are to be executed. Operating Systems and pre-Operating System components are complex and require a loading (i.e., "boot") process to load them into the platform's memory. The platform loads the OS when the platform transitions from a power-off or suspend state to a power-on state, or when a reset signal is applied to the platform's reset line. Herein, the term "platform reset" may be used to refer to any of these conditions. The platform initialization code (PIC) includes two components: the Platform Initialization Boot Block (PIBB) and the Main Platform Initialization Code (MPIC). After a platform reset occurs, the central processing unit (CPU) begins execution at a well known and defined location within the PIBB. This code is intentionally small, robust, and secure. The PIBB executes code to enable devices on the platform necessary for the Main Platform Initialization Code to execute. The PIBB then passes control of the platform to the Main Platform Initialization Code.

The Main Platform Initialization Code performs necessary functions to complete the initialization of the platform. Such functions may include initializing devices embedded within the platform, and locating and initializing optional plug-in or embedded adapters (having their own device initialization code). After this, the Main Platform Initialization Code locates the OS Loader and executes it. The OS Loader, in turn, loads the OS into memory and begins executing the OS. At this point, the platform is considered in the OS-present state and is fully under control of the loaded OS.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
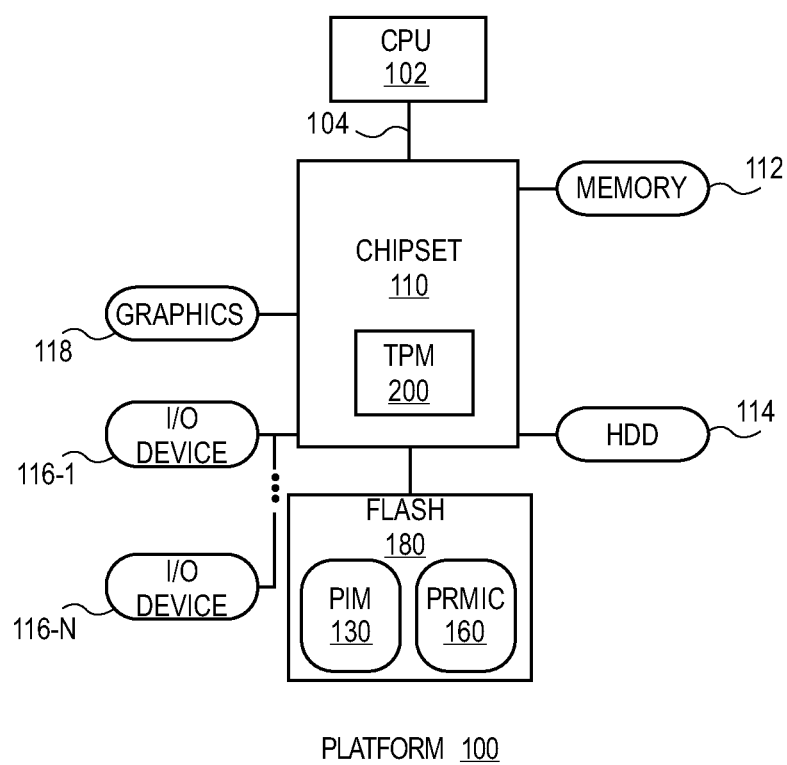
FIG. 1 is a block diagram illustrating a platform including a trusted platform module (TPM) and one or more trusted system services for binding TPM keys to execution entities, in accordance with one embodiment.

A method and apparatus for binding trusted platform module (TPM) keys to execution entities are described. In one embodiment, the method includes the receipt of an authorization request issued by an execution entity for authorization data. According to the authorization request, the execution entity may be measured to generate an entity digest value. Once the entity digest value is generated, a platform reference module may grant the authorization request if the entity digest value verifies that the execution entity is an owner of the key held by the TPM. Accordingly, in one embodiment, a platform reference module, rather than an execution entity, holds the authorization data required by a TPM to use a key owned by the execution entity and held within sealed storage by the TPM.

In the following description, certain terminology is used to discuss features of the present invention. For example, a "platform" includes any product that performs operations for subsequent analysis and verification of the platform's boot process. Examples of the platform include, but are not limited or restricted to a computer (e.g., desktop, a laptop, a server, a workstation, a personal digital assistant or other held-held, etc.); communication equipment (e.g., wireless handset, facsimile, etc.); a television set-top box and the like. A "link" is broadly defined as one or more information-carrying mediums such as electrical wire, optical fiber, cable, trace, or even a wireless channel using infrared, radio frequency (RF), or any other wireless signaling mechanism.

In addition, the term "information" is defined as one or more bits of data, address, and/or control. A "software module" includes code that, when executed, performs a certain function. Examples of a software module include an application, an applet, or even a series of code instructions, possibly a subset of code from an applet, acting as a lesser sized software module.

A "cryptographic operation" is an operation performed for additional data security. For example, one type of cryptographic operation involves digital signing information to produce a digital signature. This digital signing operation may be in accordance with Digital Signature Algorithm (DSA). Another type of cryptographic operation involves hashing, namely a one-way conversion of information to a fixed-length representation. Often, this representation, referred to as a "hash value" or an "identifier", is substantially less in size than the original information. It is contemplated that, in some cases, a 1:1 conversion of the original information may be performed.

Trust is established when a first entity (e.g., a program executing on behalf of a person or organization) acquires a basis to believe that the status, configuration and responses received from a second entity (e.g., a personal computer) are precisely as they are represented to the first entity. The Trusted Computing Group (TCG) has developed a standard to provide the industry with a set of operation conditions that enables trust in computer platforms and environments.

In accordance with a TCG Specification entitled "Main Specification Version 1.2b," published on or around Apr. 28, 2004, each personal computer (PC) is implemented with a trusted hardware device referred to as a Trusted Platform Module (TPM). The proposed behavior of a TCG enabled device requires roots of trust or components that must be trusted because misbehavior of such components may not be detected. As defined by the TCG, there are commonly three roots of trust in a trusted platform: a root of trust for measurement (RTM), a root of trust for storage (RTS) and a root of trust for reporting (RTR). The root of trust for storage, or RTS, protects keys and data entrusted to the TPM. The RTS manages a small amount of volatile memory where keys are held while performing signing and decryption operations. Inactive keys may be encrypted and moved off-chip to make room for other more active keys.

FIG. 1 is a block diagram further illustrating platform 100 including a trusted hardware device 200, such as a TPM for binding TPM keys to execution entities, in accordance with one embodiment. Representatively, platform 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality.

Representatively, graphics block 118 hard drive devices (HDD) 114 and main memory 112 may be coupled to chipset 110. In one embodiment, chipset 110 is configured to include a memory controller and/or an input/output (I/O) controller to communicate with I/O devices 116 (116-1, ..., 116-N). In an alternate embodiment, chipset 110 is or may be configured to incorporate graphics block 118 and operate as a graphics memory controller hub (GMCH). In one embodiment, main memory 112 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

Figure 2:
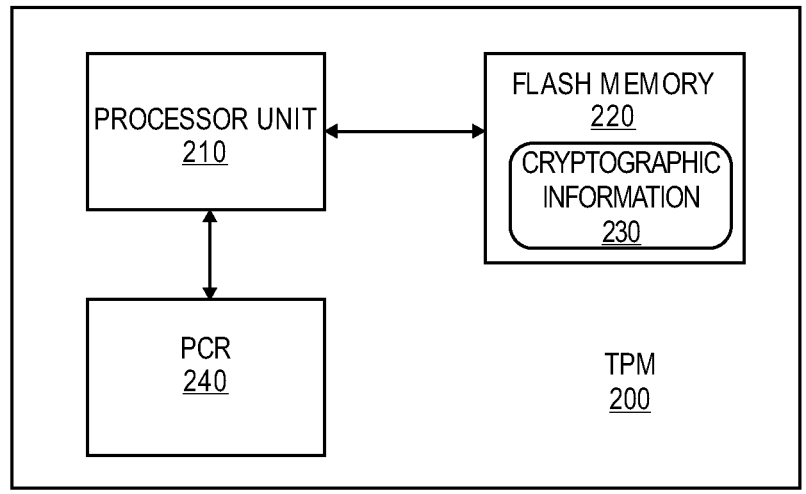
FIG. 2 is a block diagram further illustrating the TPM of FIG. 1, in accordance with one embodiment.

FIG. 2 further illustrates Trusted Platform Module (TPM) 200 of platform 100, in accordance with one embodiment. TPM 200 is a cryptographic device that is manufactured by device manufacturer(s) 110. In one embodiment, TPM 200 comprises processor unit 210 with a small amount of on-chip memory encapsulated within a package. In one embodiment, the encapsulated memory may be used to store an endorsement key pair received from a certifying manufacturer. In one embodiment, TPM 200 further comprises non-volatile memory 220 (e.g., flash) to permit storage of cryptographic information 230 such as one or more of the following: keys, hash values, signatures, certificates, etc. As described herein, keys protected by TPM 200 by encrypting the keys with a respective parent key contained in a sealed storage of TPM 200 are referred to as "TPM keys." In one embodiment, the cryptographic information is a cryptographic key received from a certifying manufacturer.

As shown below, a hash value of "X" may be represented as "Hash(X)". Of course, it is contemplated that such information may be stored within external memory 180 of platform 100 in lieu of flash memory 200. The cryptographic information may be encrypted, especially if stored outside TPM 200. As further illustrated, TPM 200 includes platform configuration registers (PCR) 240, which may be used to store, for example, platform metrics to perform a PCR binding between data protected by TPM 200 and a platform configuration state that is required before TPM 200 allows use of a key or other protected information.

As shown in FIG. 2, TPM 200 may rely on PCR bindings to ensure that private keys in TPM 200 are only used by an authorized system (as defined by the state of the platform and software). As described herein a "PCR binding" refers to a platform configuration state that is required before TPM 200 will allow use of a key having the PCR-binding. The binding occurs by selecting a set of platform metrics and generating a hash value of the platform metrics to form a digest value and storage thereof within PCR 240 of TPM 200, such that subsequent access to the key having PCR-binding requires a platform configuration state to match the platform configuration state stored within PCR 240 as a digest value.

Unfortunately, when there are mutually-distrusting entities entering and leaving the system in a dynamic manner, it no longer suffices to provide a PCR binding of a key to a fixed software configuration. In other words, if an execution entity (app A) has key $K_A$, and digest $D_A$, and $K_A$ has PCR binding $A=D_A$, this only ensures that app A is loaded when $K_A$ is used, not necessarily that A has initiated this usage of the key $K_A$. Hence, another loaded entity may have used the key instead.

Figure 3:
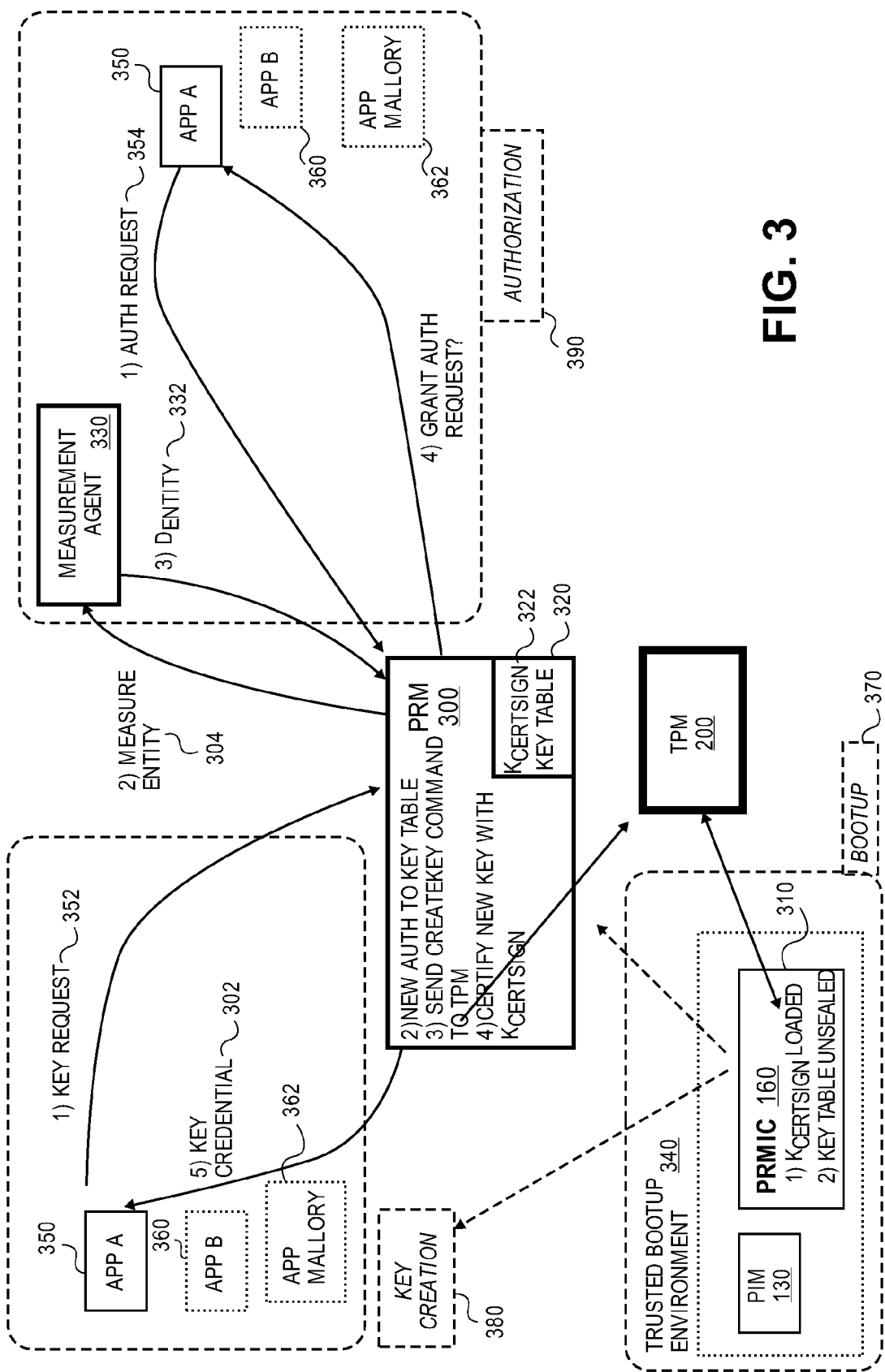
FIG. 3 is a block diagram illustrating a platform reference module (PRM) for binding TPM keys to execution entities, in accordance with one embodiment.

FIG. 3 illustrates a platform reference monitor (PRM) 300 to provide a binding of a key to an execution entity, in accordance with one embodiment. As described herein, an execution entity may refer to any type of firmware, software or combination thereof whose activity is directed according to a plurality of programmed instructions. According to the TCG Specification, TPM keys reside within a hierarchy with a key known as the "storage root key" (SRK) residing at the top of the hierarchy or root of the tree.

Accordingly, any TPM operation on a key requires presentation of the authorization data to TPM 200 along with the command and its parameters (e.g., the authorization data is often a hash of a pass phrase). This authorization data is created by the entity that causes the key to be created and is inserted into a key blob using a particular protocol. It is important to understand that all keys do not reside in the TPM simultaneously. Rather, when they are created, they are assigned a parent key. This parent key is used to encrypt private components of the new key so that it can be stored outside a TPM 200 as a "key blob" and remain protected, such as, for example, within flash memory 180, as shown in FIG. 1. When needed, the key blob is reloaded and decrypted by the same parent key.

As shown in FIG. 3, PRM 300 includes key table 310, which contains authorization data required by TPM 200 for use of keys owned by execution entities (e.g., execution entities APP A 350 and APP B 360). Accordingly, in one embodiment, PRM 300 is the only entity to know the authorization data associated with every key protected by PRM 300. Hence, PRM 300 is a mandatory access control (MAC) enforcement point for key usage. In one embodiment, PRM 300 ensures that an execution entity 350 requesting to use a key is an owner of the key; and if the condition is satisfied, the PRM authorizes an authorization request 354 for authorization data issued by an execution entity 350. This process of ensuring that only the correct entity has access to a key is referred to herein as "binding a key to an execution entity".

In one embodiment, the use of PRM 300 for binding a key to an execution entity requires that the PRM 300 to have exclusive access to TPM keys owned by PRM 300 and protected by TPM 200. Unfortunately, existing TPM mechanisms for key protection do not directly enable a system application running in a dynamic and adversarial environment to ensure it has exclusive access to its keys, even if the application is strongly isolated from other entities on the system. This deficiency exists because standard PCR bindings only consider what entities are loaded on the system and not which entity actually initiated a key usage. Furthermore, a system application cannot rely on a user to enter an authorization for a key every time a key needs to be used.

Accordingly, in one embodiment, bootup keys owned by the PRM 300 or other trusted system service include a PCR-binding to a trusted bootup environment 340, for example, as defined by PCR's, $BOOTENV_1$ to $BOOTENV_k$, and PCR POST_BOOT. Accordingly, in one embodiment, providing the PRM 300 or other trusted system service exclusive access to its keys during the trusted bootup environment 340 assumes that the PCR POST_BOOT has a default value of 0x00 during bootup and is extended (to a non-null value) once bootup proceeds beyond the initial stage. This will ensure that the bootup keys of a trusted system service (PRM 300) can only be used in the trusted bootup environment as defined by, for example, PCR's, $BOOTENV_1$ to $BOOTENV_k$, and not once the bootup process has proceeded further.

Figure 4:
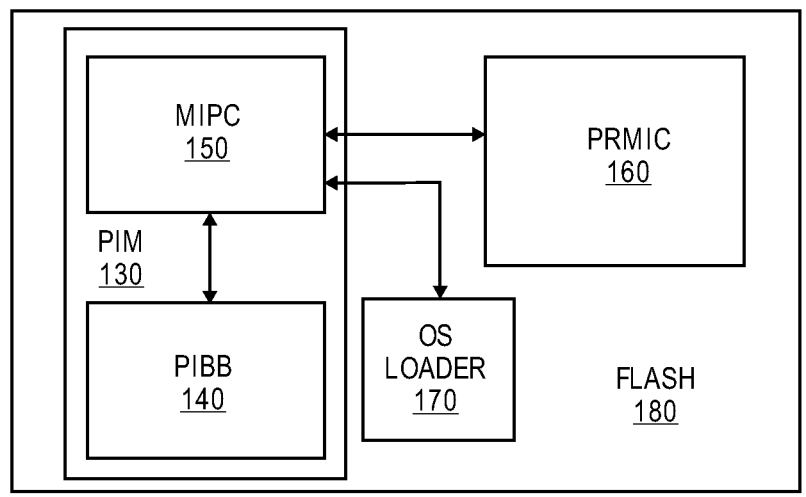
FIG. 4 is a flowchart further illustrating flash memory 180 of FIG. 1 to include platform reference module initialization code (PRMIC) to provide a trusted system service exclusive access to one or more bootup keys, in accordance with one embodiment.

FIG. 4 further illustrates, in one embodiment, PRM initialization code (PRMIC) 160, as shown in FIG. 1, to bootstrap the platform 100 to the trusted bootup environment 340, referred to herein as a "trusted platform bootup state." As previously described, PIM 130 may include a platform initialization boot block (PIBB) 140 and a main platform initialization code (MPIC) 150. In one embodiment, MPIC 150 is modified to invoke PRMIC 160 to bootstrap the platform 100 to a trusted platform bootup state 340, which may be referred to herein as "the key bootstraping mechanism." In one embodiment, this trusted platform bootup state may be measured to generate a digest value, which is stored within PCRs 240, as shown in FIG. 2 to enable subsequent detection of a trusted platform bootup state by TPM 200.

In accordance with this embodiment, bootup keys owned by a trusted system service or PRM 300 may include a storage key ($K_{BOOTSTORE}$), which loads the PRM's keys (to be used in the normal dynamic operating environment). In addition, the bootup keys further include a signing key $K_{BOOTSIGN}$, which certifies keys loaded by $K_{BOOTSTORE}$. In one embodiment, PRM 300 can only use $K_{BOOTSIGN}$ to certify the keys, which are parented under $K_{BOOTSTORE}$ and thus limited loading in the trusted platform bootup state. In one embodiment, PRM 300 is limited to certification of keys loaded by $K_{BOOTSTORE}$ to the trusted platform bootup state, using $K_{BOOTSIGN}$ to provide a credential for a key K. The main information conveyed by credential on a key K and signed by $K_{BOOTSIGN}$ is that K is subject to protection associated with the $K_{BOOTSIGN}$ (i.e., K is parented under $K_{BOOTSTORE}$); K is protected by the key bootstraping mechanism. Optionally, the credential can contain other data carried in a TPM_CERTIFY_INFO structure, similar to K's PCR bindings, as defined by the TCG Specification.

Accordingly, referring again to FIG. 3, a key table 320 of PRM 300 may be sealed according to a key $K_{TABLE}$, which is a child key of $K_{BOOTSTORE}$. In one embodiment, to unseal key table 310, loading of $K_{TABLE}$ is required. As a result, loading of $K_{TABLE}$ requires loading of $K_{BOOTSTORE}$, which includes a PCR binding, such that TPM 200 limits use of $K_{BOOTSTORE}$ to the trusted platform bootup state, as defined by PCR's, $BOOTENV_1$ to $BOOTENV_k$, where the PCR POST_BOOT value is 0x00. Consequently, since $K_{BOOTSTORE}$ includes a PCR binding to the trusted platform bootup state, use of $K_{TABLE}$ to unseal key table 310 is limited to the trusted platform bootup state. As a result, PRM 300 is guaranteed exclusive access to keys and data required for binding TPM keys to execution entities. In other words, the single thread of control in the trusted bootup environment 340 ensures that all entities located within the environment are trusted.

As described above, it is assumed that once PIM 130 (FIG. 4) reaches a certain point in the boot process, the POST_BOOT PCR value is extended to a non-zero value. The result is that the TPM 200 will not allow use of $K_{BOOTSTORE}$ after this point. Thus, the key bootstrapping mechanism provided by PRMIC 160 is required to unseal key table 320. The assumption here is that PIBB 140 (FIG. 4) includes an entry point to provide an root of trust for measurement (RTM) to measure PIBB 140, and MIPC, 150, PRMIC 160 and OS loader 170, prior to the transfer or control thereto. This measurement provides the assurance that once platform bootup proceeds to later stage, PIM 130 will extend the PCR POST-_BOOT a value to exit trusted platform bootup environment 340.

As further illustrated in FIG. 3, once PRM 300 has loaded $K_{CERTSIGN}$ 322 unsealed key table 320, PRM 300 may operate as a mandatory access control of keys owned by execution entities (350 and 360) and contained within sealed storage by TPM 200. In accordance with the embodiment illustrated in FIG. 3, during key creation state 380, an execution entity (e.g., app A) 350 is required to send a key request 332 or new key template to PRM 300. In response to receipt of the new key template, PRM 300 generates authorization data required by TPM 200 to access the requested key once created by TPM 200 and stored within sealed storage by TPM 200.

In one embodiment, PRM 300 requests an entity digest value (measure entity 304) from measurement agent 330. In one embodiment, measurement agent 330 computes a hash of a binary executable of execution entity 350 to form the entity digest value($D_{ENTITY}$ 332). Once received, PRM 300 stores the authorization data and the entity digest value 332 within key table 310. Subsequently, PRM 300 may send a CreateKey command to TPM 200, including the authorization data generated by PRM 300. In response, TPM 200 will generate the requested key and return a key blob to PRM 300. In response, PRM 300 will generate a key credential for the new key and sign the key credential using $K_{CERTSIGN}$ key 350. This key credential, along with the key blob (excluding the authorization data), is returned to the execution entity 310 (key return 302). Hence, in accordance with such an embodiment, execution entities are prohibited from access to the authorization data required by TMP 200 to use their respective keys.

Accordingly, as shown in FIG. 3, during authorization state 390, the execution entity 350 is required to send an authorization request for authorization data required to use a key K by TPM 200. In response to the authorization request 354, PRM 300 may direct measurement agent 330 to generate an entity value ($D_{ENTITY}$) 332 of the execution entity 350. Using the entity digest 332, PRM 300 may consult key table 320 to determine whether the entity digest 332 is equal to an owner digest value of the owner of key K. The PRM 300 may grant the authorization request 354 issued by execution entity 350 if the execution entity 350 is verified as the owner of the key according to the entity digest value 332.

In one embodiment, there are two options for how PRM 300 can authorize an authorization request 354 from an execution entity 350 once the PRM 300 has ascertained that the execution entity 350 is, in fact, the owner of the key. As described herein, the two options are referred as "authorization disclosure mechanisms". In one embodiment, PRM 300 may simply provide the authorization data to the execution entity 350, which should then use the authorization data to issue commands to TPM 200 and subsequently destroy the authorization data once the execution entity 350 has completed issuance of commands to TPM 200.

In an alternative embodiment, PRM 300 may grant the authorization request 354 and apply the authorization data to each command issued by the execution entity 350 to the TPM 200, which requires the authorization data. In accordance with such an embodiment, the execution entity 350 does not learn the value of the authorization data. In addition, the PRM 300 does not learn much about the execution entity's TPM command. The auth-disclosure mechanism specified by the TCG Specification allows this to be done cleanly, as described below.

The normal use of the authorization data is to produce a keyed-hash message authentication code (HMAC) of command parameters, which a TPM 200 checks by constructing the same HMAC itself. The value of this keyed digest is:

$$HMAC_{K.auth}(\text{Parameter digest+both nonces+continue session flag}) \quad (1)$$

Thus, the execution entity 350 may pass the HMAC parameters to the PRM 300, which can apply the HMAC using the authorization data($K_{.auth}$), which it knows. As a result, no one outside PRM 300 is able to discover the value of the authorization data. In a further embodiment, the authorization data is also used to generated the shared secret for an object independent authorization protocol (OSAP) authorization session for a key K:

$$\text{SHARED-SECRET}=HMAC_{K.auth}(\text{concat(OSAP nonces)}). \quad (2)$$

Again, the execution entity 350 can pass the HMAC input (the nonces) to PRM 300, which apply the authorization data without revealing the authorization data. Hence, the authorization disclosure mechanism, as described herein, provides a way to balance the convenience for the application with protection against leakage of the authorization data; namely, if on the one hand the application can reasonable expect to be safe from external interference during a run of execution, the first authorization disclosure mechanism may suffice. Conversely, if the platform in which the execution entity is running cannot guaranty the isolation of the execution entity against external adversaries, the second authorization disclosure mechanism may be used. In the embodiments herein, it is assumed that the PRM 300 is isolated from other software agents, even if the execution entities are not. Procedural methods for one or more embodiments are now described.

Operation

Figure 5:
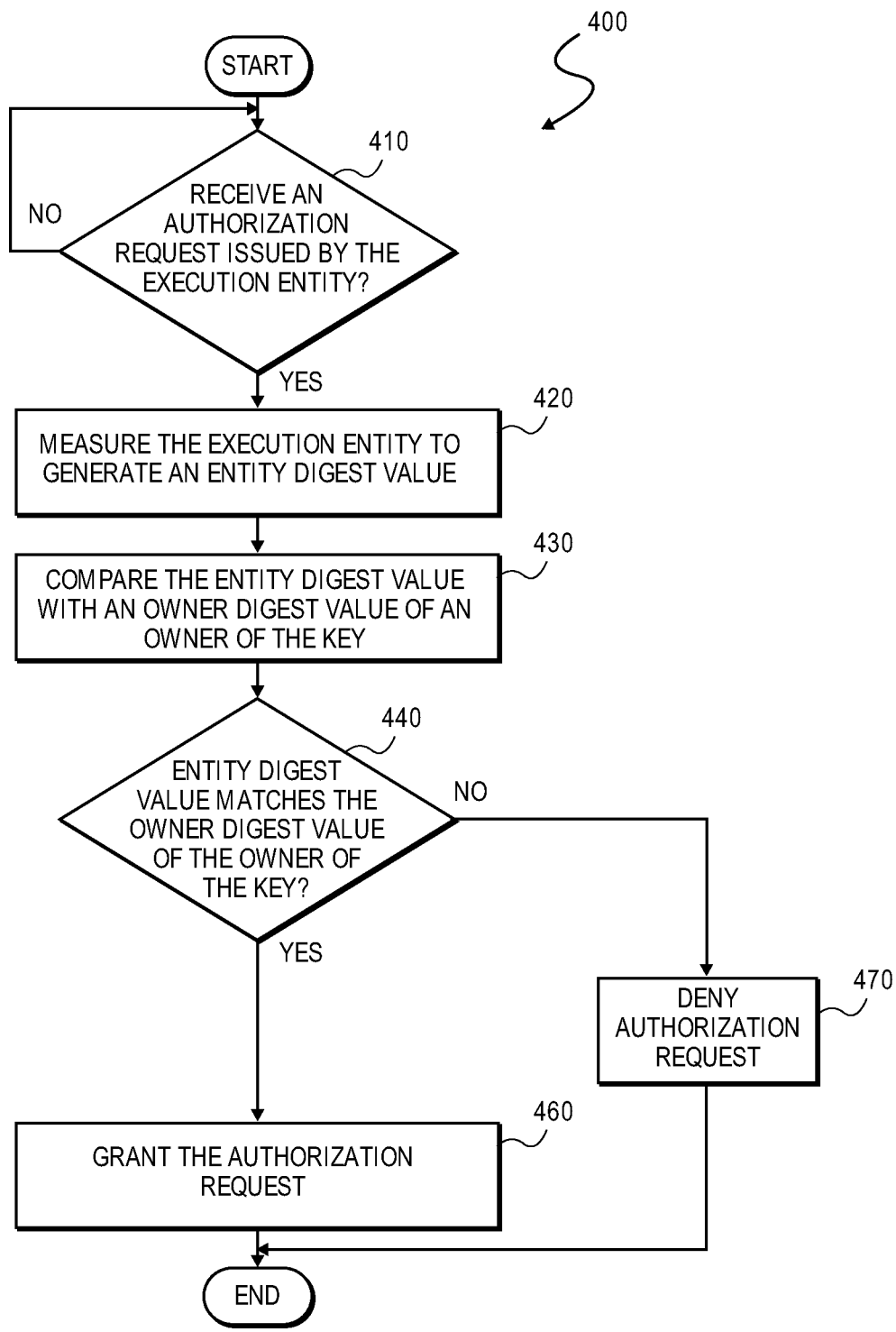
FIG. 5 is a flowchart illustrating a method for binding TPM keys to execution entities, in accordance with one embodiment.

Turning now to FIG. 5, the particular methods associated with embodiments of the invention are described in terms of computer software and hardware with reference to a flowchart. The methods to be performed by a computing device (e.g., a storage) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems.

Referring again to FIG. 5, FIG. 5 is a flowchart illustrating a method 400 for binding a TPM key to an execution entity, in accordance with one embodiment. In contrast to conventional TPM usage, in the embodiment described, a trusted platform service, such as, for example, platform reference module (PRM) 300, as illustrated in FIG. 3, holds the authorization data required a TPM for use of keys owned by execution entities. In accordance with such embodiments, PRM 300 functions as a mandatory access control point for key usage to overcome limitations associated with conventional PCR bindings, which prohibit detection of whether a request issued for use of a key is from an actual owner of the key.

Referring again to FIG. 5, at process block 410, it is determined whether an authorization request is received from an execution entity. Once received, at process block 420, the execution entity is measured to generate an entity digest value. At process block 430, the entity digest value is compared with an owner digest value of an owner of the key. At process block 440, it is determined whether the entity digest value matches the owner digest value of the owner key. When such a match is detected, the execution entity is verified as the owner of the key. Accordingly, at process block 460, the PRM grants the authorization request. Otherwise, at process block 670, the authorization request is denied to prohibit the execution entity from use of the key protected by the TPM.

Figure 6:
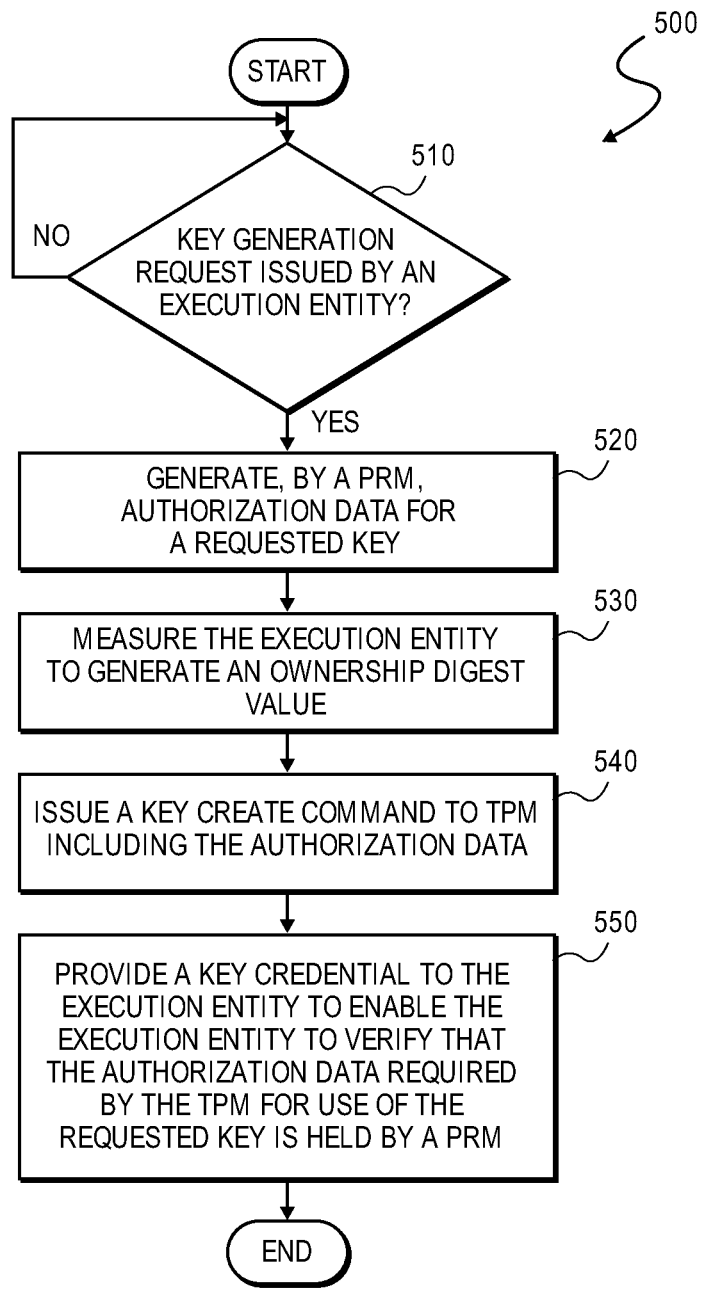
FIG. 6 is a flowchart for generating PRM protected key, in accordance with one embodiment.

FIG. 6 is a flowchart illustrating a method 500 for creating a PRM protected key, in accordance with one embodiment. At process block 510, it is determined whether a key generation request is issued by an execution entity. When such a key generation request is issued by an execution entity, at process block 520, a PRM generates authorization data for the key requested by the execution entity. As indicated above, this authorization data will be required by a TPM for use of the requested key once generated and stored in sealed storage by the TPM.

Following generation of the authorization data, at process block 530, the execution entity is measured to generate an ownership digest value. In one embodiment, the measurement is provided by a measurement agent, such as, for example, measurement agent 330, as shown in FIG. 3. As indicated above, this measurement may be a hash value of a binary executable version of the execution entity. Once the execution entity is measured, at process block 530, a key creation command may be issued to the TPM, including the authorization data generated by the platform reference module. Finally, at process block 550, once the requested key is generated by the TPM, the platform reference module may provide a key credential to the execution entity to enable the execution entity to verify that authorization data required by the TPM for use of the requested key is held by a PRM.

In one embodiment in which a relying party (e.g., a signature verifier) requires assurance that a given key is protected by a PRM, the execution entity may provide such assurance to the relying party in the form of the key credential or "app-binding key credential" for the key. The app-binding key credential for the key should convey the following information:

K.auth is only known to a PRM with code digest $D_{PRM}$;

The digests of PRM's environment are $D_{ENV(1)}, \ldots, D_{ENV(N)}$ representing N (for presumably small N) entities like the PIM 130, PRMIC 160 and other trusted computing blocks (TCBs) 310 (FIG. 3) of PRM 300 (FIG. 3).

The app A to which the key is bound has digest $D_A$;

The auth-disclosure mechanism is use is X (i.e., PRM gives app the auth; or PRM applies the auth to every command, without revealing it).

This information could be conveyed by a new credential containing exactly this information. Another option is to represent it in a TCG key-certification credential for the key (data type TPM_CERTIFY_INFO or TPM_CERTIFY_INFO12), which contains:

PCR bindings:
PRM=$D_{PRM}$,
ENV(1)=$D_{ENV(1)}$, ..., ENV(N)=$D_{ENV(N)}$, where the ENV (1)'s are the well-known elements of TCB 310 of PRM 300 (FIG. 3),
A=$D_A$.

In addition, the authDataUsage field in TMP_CERTIFY_INFO set to X, the auth-disclosure mechanism.

A relying party should know to interpret such a TPM_CERTIFY_INFO as being an app-binding key credential if it is signed by a credential-signing key of a known PRM. In one embodiment, the establishment of PRM's credential-signing key is performed using the key bootstraping mechanism described above.

Figure 7:
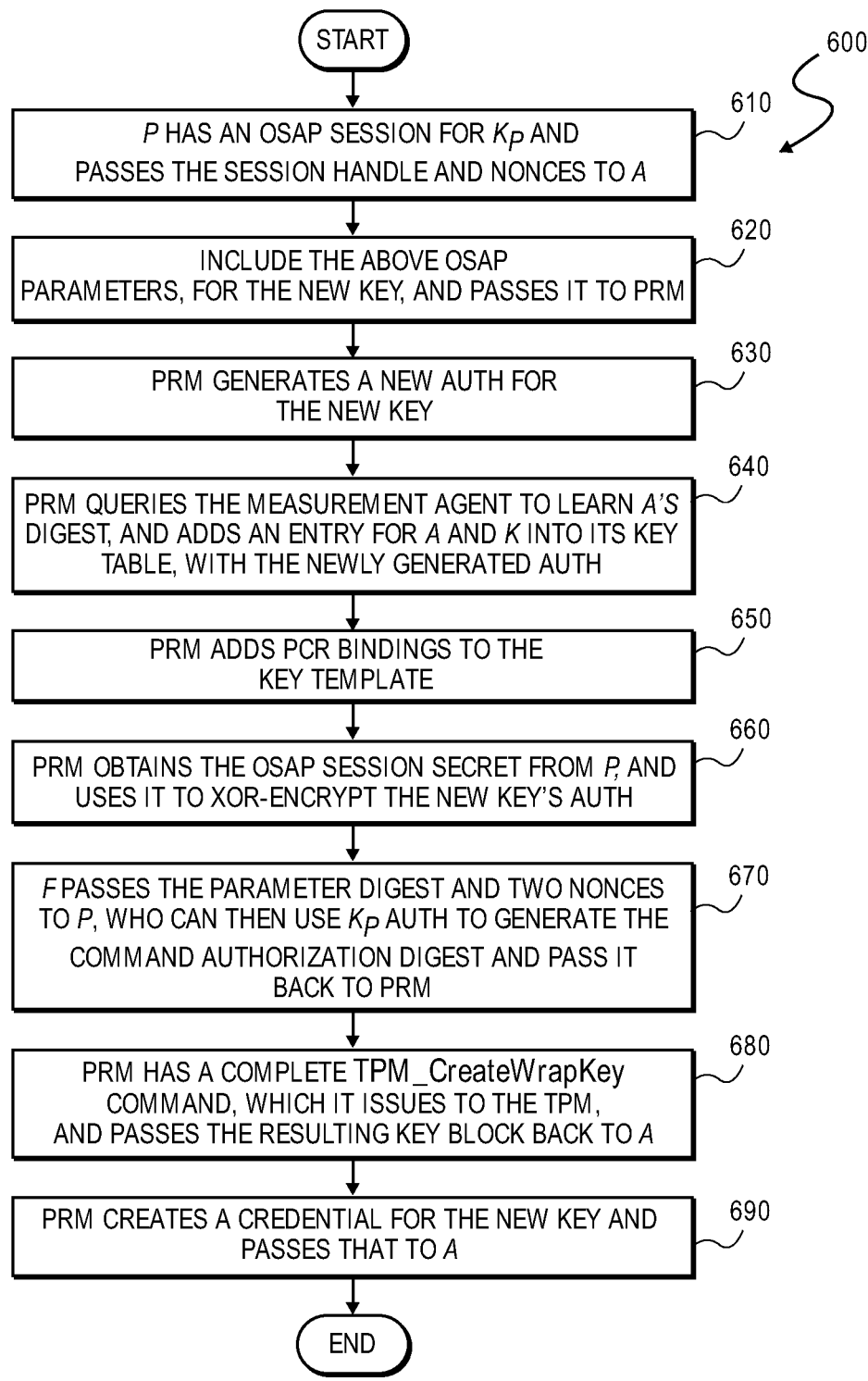
FIG. 7 is a flowchart illustrating a method for generating a PRM protected key, in accordance with one embodiment.
Figure 8:
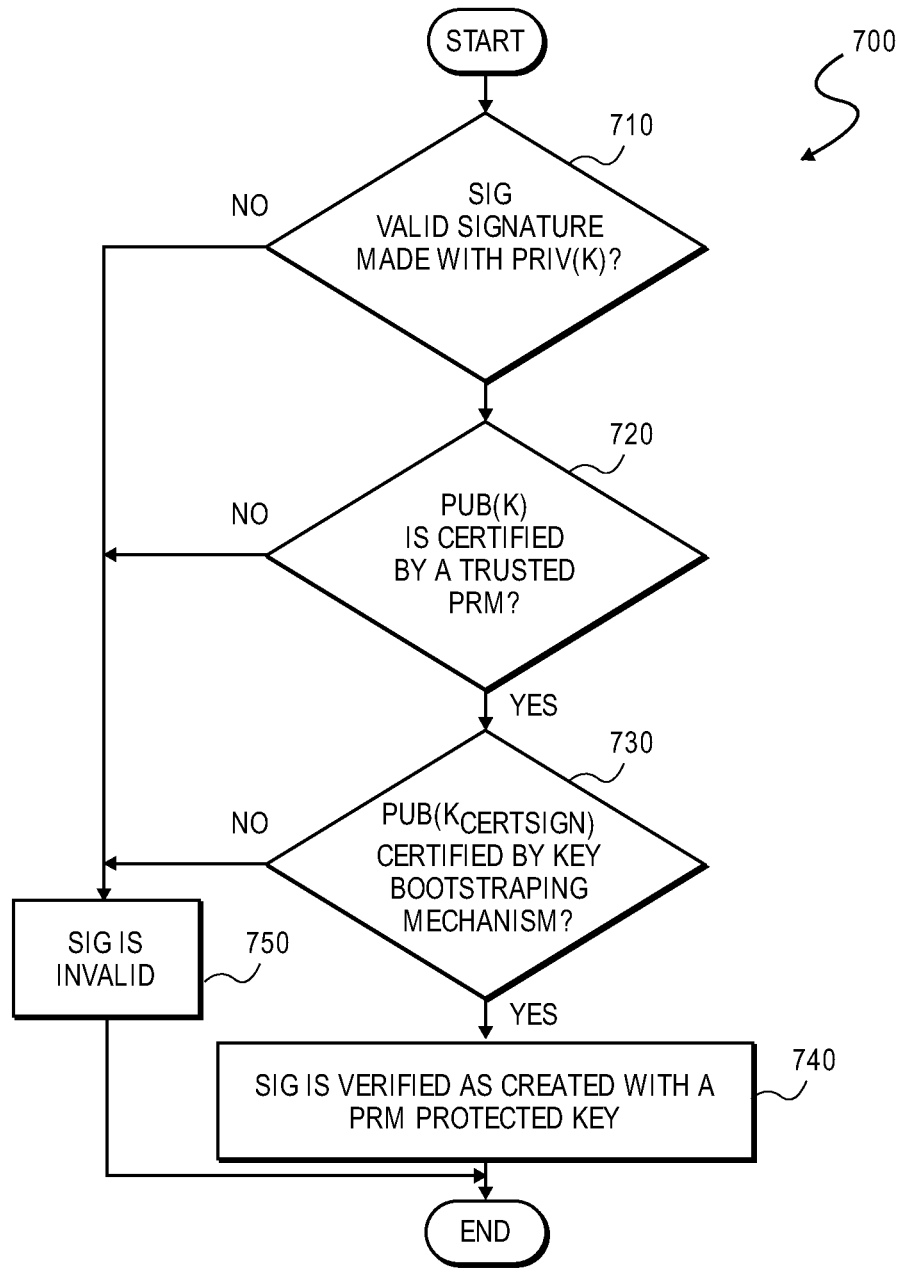
FIG. 8 is a flowchart for verifying whether a signature is generated by a PRM protected key, in accordance with one embodiment.

FIG. 7 is a flowchart illustrating an alternate method 600 for creating a PRM protected key, in accordance with one embodiment. As illustrated with reference to FIG. 7, the creation of the PRM protected key assumes that the entity controlling the parent key of a key requested by the execution entity is an entity (P). Hence, control of the parent key of the requested key is not being performed by a PRM. Accordingly, as illustrated with reference to FIG. 7, at process block 610, the controlling entity (P) engages in an OSAP session for the parent key ($K_P$) and passes the session handle and nonces to A. At process block 520, the execution entity (A) prepares a key creation command template including the OSAP parameters of process block 510 for the new key and passes the key creation command template to the PRM. In one embodiment, the key creation command provided to the platform reference module is a partially completed TPM-KEY or TPM-KEY12 structure, as described by the TCG Specification.

At process block 530, the PRM generates new authorization data for the requested key. At process block 540, the PRM queries a measurement agent to learn a digest value of the execution entity (owner digest) and adds an entry for the execution entity and the requested key into a key table with the newly-generated authorization data. At process block 550, the PRM adds PCR bindings to the key template, such as, for example, to illustrate that the PRM has exclusive access to the described key. At process block 560, the PRM obtains the OSAP secret session from entity P and uses it to perform an exclusive OR (XOR) encryption of the authorization data. At process block 570, the PRM passes the parameter digest two nonces to P, who can use the authorization data to generate a command digest and pass the command digest to the platform reference module.

In one embodiment, the command authorization digest is generated according to an HMAC on the parameter digest nonces using the authorization data as the key. At process block 550, the platform reference module may issue a TPM_CreateWrap key command to the TPM and pass the resulting key blob (excluding the authorization data) to the execution entity A. Finally, at process block 590, the PRM creates a credential for the new key and passes the key to the execution entity. In the embodiment described with reference to FIG. 7, the method may simplified, as illustrated with reference to FIG. 6, if the platform reference module holds the parent key $K_P$ of the requested key.

In one embodiment, a challenger may want to verify a signature made with a PRM protected key. FIG. 7 is a flowchart illustrating a method 700 to enable a relying party V to verify that a signature (SIG) was made by the correct app A using key K protected by a PRM. At process block 710, the relying party verifies that the signature (SIG) is a valid signature made with a private portion of key K. At process block 720, it is determined whether the public portion of the key K PUB (K) is certified by a trusted PRM. In one embodiment, certification of a key by a trusted PRM is performed using a credential of key $K_{CERTSIGN}$; the credential contains the following information:

K's PCR bindings:
PRM=$D_{PRM}$, where $D_{PRM}$ is the well-known digest of PRM,
ENV(1)=$D_{ENV(1)}$, ..., ENV(N)=$D_{ENV(N)}$, where the ENV (1)'s are the well-known elements of TCB 310 of PRM 300 (FIG. 3),
A=$D_A$, where A is the name of the signing app, and $D_A$ is that app's well-known digest.

Field authDataUsage set to the auth-disclosure mechanism.

In one embodiment, the relying party interprets this credential as key $K_{CERTSIGN}$ certifies that key K belongs to app A, and is access-controlled by PRM running in a TCB as stated, and using auth disclosure mechanism X. At process block 730, the public portion of the certification key is certified as loaded using the key bootstrapping mechanism in accordance with one embodiment. As described above with reference to the TPMIC, a credential for the public portion of $K_{CERTSIGN}$ includes the following PCR bindings:

ENV(1)=$D_{ENV(1)}$, ..., ENV(N)=$D_{ENV(N)}$, where the ENV (1)'s are the well-known elements of TCB 300 of PRM 300 (FIG. 3).

The relying party interprets this credential as key $K_{CERTSIGN}$ is exclusively held by a trusted PRM, as assured by the key bootstrapping mechanism. Additionally, the TCB elements (e.g., TCB 310 of PRM 300 as shown in FIG. 3) required to isolate the trusted PRM securely are as listed in $K_{CERTSIGN}$'s PCR bindings. Accordingly, if the public portion of $K_{CERTSIGN}$ is certified by the key bootstrapping mechanism, such as, for example, performed by PRMIC 160, as shown in FIGS. 1 and 4, at process block 740, the signature is verified as created with a PRM protected key. Otherwise, at process block 750, the signature is identified as invalid and is not accepted by the relying party V.

Referring again to FIG. 3, in the embodiment described, PRM 300, using for example, PRMIC 160, gains exclusive access to a signature key ($K_{CERTSIGN}$) and key table 320 required by PRM 300 for binding TPM keys to execution entities. In the embodiment described, execution entities (350 and 360) direct key generation requests to PRM 300 rather than TPM 200. As a result, PRM 300 provides a repository for the authentication information required by TPM 200 to use the keys owned by execution entities (350 and 360). Therefore, by providing a mandatory access control point for key usage, PRM 300 can ensure that an execution entity requesting use of a TPM key is the actual owner of the TPM key, for example, by measuring and comparing a digest value of the execution entity with an owner digest value of an owner of the key. Consequently, rogue entities, such as App Mallory 362 are prevented from accessing keys owned by other execution keys and protected by TPM 200.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments of the invention, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
   measuring an execution entity to generate a digest value, according to an authorization request issued by the execution entity for authorization data, wherein the digest value is for a trusted hardware entity to use a key protected within the trusted entity; and
   granting the authorization request if it is verified via the digest value that the execution entity is an owner of the key,
   wherein granting the authorization request is to ensure that the execution entity has exclusive access to the key.

2. The method of claim 1, wherein granting the authorization request further comprises:
   transmitting the authorization data to the execution entity.

3. The method of claim 1, wherein granting the authorization request further comprises:
   applying the authorization data to each command issued by the execution entity to the trusted hardware entity for use of the key to prohibit disclosure of the authorization data to the execution entity.

4. The method of claim 3, wherein applying the authorization data further comprises:
   receiving command parameters from the execution entity;
   applying the authorization data to the received command parameters to generate a command digest value;
   transmitting the command digest value to the execution entity; and
   issuing, by the execution entity, the command digest value to the trusted hardware entity for use of the key.

5. The method of claim 1, wherein granting comprises:
   comparing the digest value of execution entity with a digest value of the owner of the key; and
   verifying the execution entity as the owner of the key if the digest value of the execution entity matches the digest value of the owner of the key.

6. The method of claim 1, wherein the trusted hardware entity does not store all keys simultaneously.

7. The method of claim 1, wherein trusted hardware entity is a trusted platform module (TPM).

8. The method of claim 1, wherein measuring the execution entity to generate the digest value comprises computing a hash of a binary executable of the execution entity to generate the digest value.

9. An article of manufacture comprising a non-transitory machine-accessible storage medium having associated instructions that, when accessed, results in a machine performing a method comprising:
   measuring an execution entity to generate a digest value, according to an authorization request issued by the execution entity for authorization data, wherein the digest value is for a trusted entity to use a key protected within the trusted entity; and
   granting the authorization request if it is verified via the digest value that the execution entity is an owner of the key, wherein granting the authorization request is to ensure that the execution entity has exclusive access to the key.

10. The article of manufacture of claim 9, wherein granting the authorization request further results in the machine performing a method comprising:
    transmitting the authorization data to the execution entity.

11. The article of manufacture of claim 9, wherein granting the authorization request further results in the machine performing a method comprising:
    applying the authorization data to each command issued by the execution entity to the trusted entity for use of the key to prohibit disclosure of the authorization data to the execution entity.

12. The article of manufacture of claim 11, wherein applying the authorization data further results in the machine performing a method comprising:
    receiving command parameters from the execution entity;
    applying the authorization data to the received command parameters to generate a command digest value;
    transmitting the command digest value to the execution entity; and
    issuing, by the execution entity, the command digest value to the trusted entity for use of the key.

13. The article of manufacture of claim 9, wherein applying the authorization data further results in the machine performing a method comprising:
    receiving command parameters from the execution entity;
    applying the authorization data to the received command parameters to generate a command digest value;
    transmitting the command digest value to the execution entity; and
    issuing, by the execution entity, the command digest value to the trusted hardware entity for use of the key.

14. The article of manufacture of claim 9, wherein granting further results in the machine performing a method comprising:
comparing the digest value of execution entity with a digest value of the owner of the key; and
verifying the execution entity as the owner of the key if the digest value of the execution entity matches the digest value of the owner of the key.

15. The article of manufacture of claim 9, wherein the trusted hardware entity does not store all keys simultaneously.

16. The article of manufacture of claim 9, wherein measuring the execution entity to generate the digest value further results in the machine performing a method comprising computing a hash of a binary executable of the execution entity to generate the digest value.

17. A method comprising:
generating authorization data for a requested key according to a key generation request issued by an execution entity;
measuring the execution entity to generate an ownership digest value;
issuing a key creation command to a trusted entity including the authorization data, wherein the trusted entity is to require the authorization data for use of the requested key; and
providing a key credential to the execution entity to enable the execution entity to verify that the authorization data required by the trusted entity for use of the requested key is held by a platform reference module, wherein the execution entity to have exclusive access to the requested key.

18. The method of claim 17, wherein providing the key credential to the execution entity further comprises:
generating the key credential to include a digest of the platform reference module, a digest of trusted computing blocks of the platform reference module, and an authorization disclosure mechanism; and
signing the key credential with a certification key owned by the platform reference module.

19. The method of claim 17 further comprises:
storing the ownership digest value in combination with the authorization data within a key table held within sealed storage by the trusted entity,
wherein generating the authorization data for the requested is performed by the platform reference module.

20. The method of claim 17 further comprises:
receiving an authorization request issued by the execution entity for the authorization data required by the trusted entity to use the key held within sealed storage by the trusted entity;
measuring the execution entity to generate an entity digest value; and
granting the authorization request if is verified via the entity digest value that the execution entity is an owner of the key.

21. The method of claim 20, wherein granting the authorization request further comprises:
comparing the entity digest value with an owner digest value of an owner of the key; and
verifying the execution entity as the owner of the key if the entity digest value matches the owner digest value of the owner of the key.

22. The method of claim 17 further comprises:
restricting use of at least one parent key owned by the trusted entity until a trusted platform bootup state is detected; and
loading, for the trusted entity, one or more child keys of the parent key if platform metrics indicate detection of the trusted platform bootup state.

23. The method of claim 22, wherein restricting the use of the at least one parent key further comprises:
binding usage of the at least one parent key owned by the trusted entity to the trusted platform bootup state.

24. The method of claim 22, wherein loading the one or more child keys further comprises:
loading, by a parent certification key owned by the trusted platform service, a child certification key of the trusted entity; and
generating a credential for the child certification key by at least the parent certification key.

25. The method of claim 22, wherein loading the one or more child keys further comprises:
loading, by a parent storage key owned by the trusted entity, a data storage key of the trusted entity; and
unsealing, by the data storage key, a data table owned by the trusted entity.

26. The method of claim 22, wherein loading the one or more child keys further comprises:
loading a parent storage key and a signature key of the trusted entity;
loading, by the storage key, at least one child key of the trusted; and
certifying the at least one child key using the signature key.

27. A platform comprising:
a trusted entity including a processor and a non-volatile memory to provide storage of a key;
a trusted measurement agent to measure an execution entity to generate a digest value according to an authorization request issued by the execution entity for authorization data, wherein the digest value is for the trusted entity to use a key held within the non-volatile memory of the trusted entity; and
a platform reference module to grant an authorization request issued by the execution entity if it is verified via the digest value from the trusted measurement agent that the execution entity is an owner of the key, wherein granting the authorization request is to ensure that the execution entity has exclusive access to the key.

28. The platform of claim 27, wherein the trusted entity is operable to provide storage of a parent key owned by the platform reference module, wherein the trusted entity is operable to restrict use of the parent key to a trusted platform bootup state to provide the platform reference module exclusive access to load one or more child keys of the parent key during the trusted platform bootup state.

29. The platform of claim 27, wherein the platform reference module is operable to:
generate authorization data for a requested key according to a key generation request issued by the execution entity;
store a measurement of the execution entity as an owner digest value;
issue a key creation command for the requested key to the trusted entity including the authorization data, wherein the authorization data is required by the trusted entity for use of the requested key; and
provide a key credential to the execution entity to enable the execution entity to verify that the authorization data required by the trusted entity for use of the requested key is held by the platform reference module.

30. The platform of claim 27, further comprising:
a chipset coupled to the trusted entity;
a processor coupled to the chipset; and a non-volatile memory coupled to the chipset, the non-volatile memory including:
a platform initialization module to bootstrap the platform to a trusted platform bootup state required by the trusted entity for use of a parent key owned by the platform reference module and held in a storage by the trusted entity to restrict the platform reference module to exclusive access to load one or more child keys of the parent key during the trusted platform bootup state.

31. The platform of claim 27, wherein the trusted entity further comprises:
a platform configuration register (PCR) to bind use of the parent key to the trusted platform bootup state according to one or more PCR BOOTENV values and a PCR POST_BOOT value,
wherein the platform initialization module to modify a platform POST_BOOT value to disable use of the parent key once platform bootup progresses beyond the trusted platform bootup state.

* * * * *